United States Patent Office 2,948,079
Patented Aug. 9, 1960

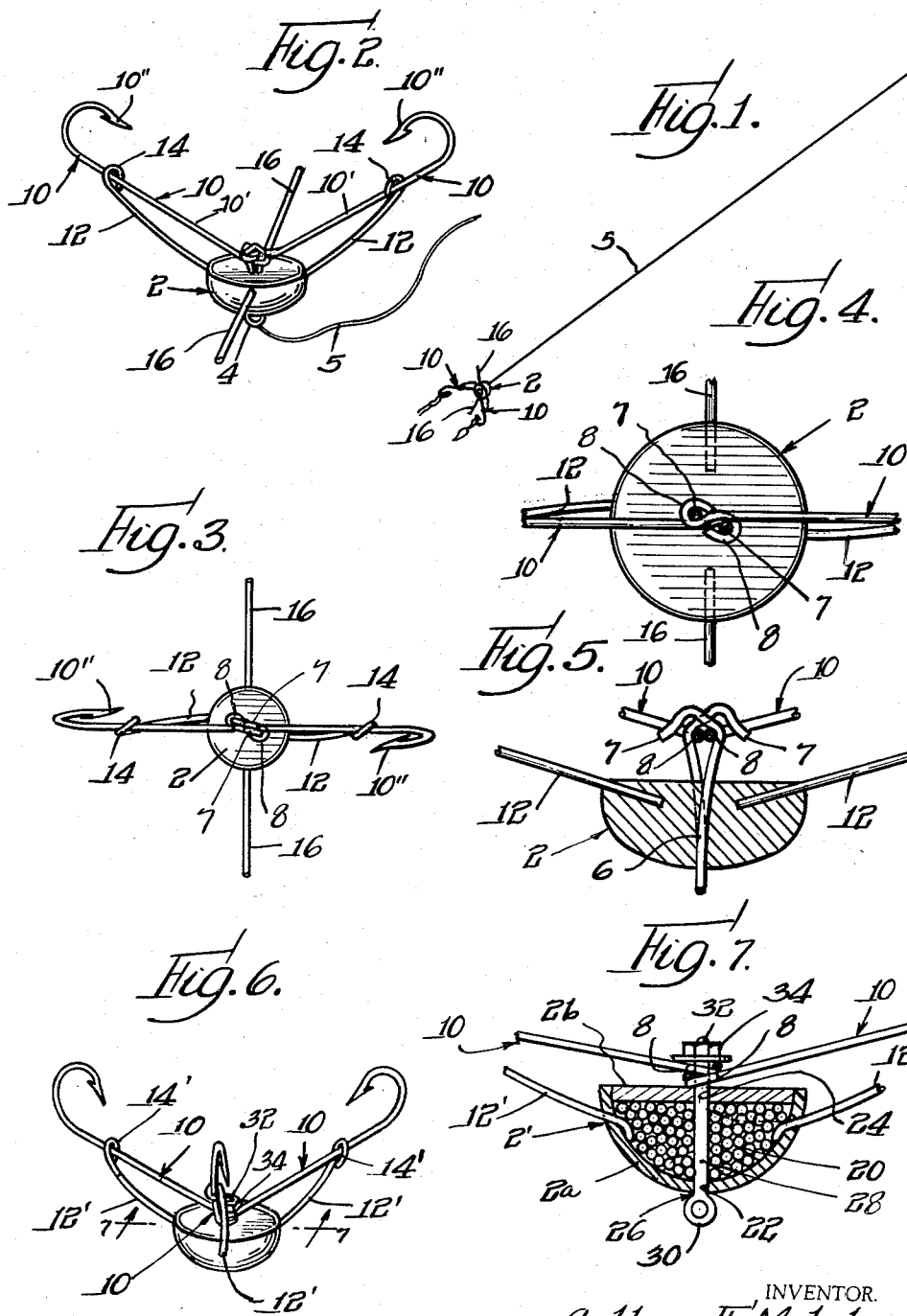

2,948,079

FISHHOOK ASSEMBLY

Arthur F. Malchert, 120 Lathrop, Forrest Park, Ill.

Filed July 18, 1957, Ser. No. 672,725

2 Claims. (Cl. 43—42.4)

This invention relates to fishing apparatus, and more particularly to a fishhook assembly.

One of the primary objects of the present invention is to provide a new and improved fishhook assembly which minimizes the possibility of the assembly being snagged in seaweed, logs, rocks and other similar underwater obstructions. A related object of the invention is to provide such an assembly wherein one or more fishhooks are each fixedly anchored in a position on the assembly which minimizes the possibility that the fishhook will be snagged in obstructions of the kind above mentioned.

Another primary object of the present invention is to provide a fishhook assembly which preferably has any one or more of the above-mentioned advantages and which furthermore is adapted to support one or more fishhooks in a manner such that the latter may be quickly and easily attached to or removed from a body member supporting the hooks.

Still another object of the present invention is to provide a fishhook assembly wherein one or more fishhooks are each maintained in a position which is easily accessible to the fish during surface and bottom still fishing or for surface and bottom troll fishing.

A still further object of the present invention is to provide a fishhook assembly having any one or more of the above-mentioned advantages, wherein the assembly simulates, in a very general way, a spider so as to be attractive to fish and the like.

A still further object of the present invention is to provide a fishhook assembly which may be inexpensively manufactured and which is strudy and reliable.

In accordance with the most preferred form of the invention, the fishhook assembly includes a body member which is preferably shaped, such as by tapering, to assume a pre-determined orientation when placed in the water. The end of the body member which is then on the bottom thereof, the narrow end thereof when the body is tapered, is preferably provided with a fish line attaching means, such as an eyelet. The opposite or top end of the body member is preferably provided with a releasable fishhook-end attaching means for removably anchoring the end of one or more fishhooks to be connected to the body member. Preferably three or four substantially equally-spaced resilient arms are fixedly connected to the body member and inclined away or upwardly and outwardly from the so-called bottom or narrow end of the body member having said fish line attaching means. During trolling, the latter end of the body member will, of course, face horizontally toward the fish line. When the fishhook assembly is sinking or is being trolled, the resilient arms fall generally along the surface of a cone which flares away from the direction of movement of the assembly. The above-mentioned resilient arms may either be the shanks of fishhooks or, more preferably, may be separate resilient arms which, in addition to their guiding or anti-snagging functions, may also support one or more fishhooks. In such case, the ends of the resilient arms may be formed into loops and the shanks of the fishhooks may be passed through the loops and the ends thereof removably anchored by said fishhook-end attaching means carried by the body member. The fishhook-end attaching means are preferably hooked projections extending from the body members. The loops in said arms are in the planes of the associated arms so that they must be flexed to receive the shanks of the associated fishhooks extending in the general directions of these arms. The inner ends of fishhooks generally are provided with eyelets and these eyelets extend over said hooked projections and are held in place thereover by the resiliency of the flexed arms. The fishhooks are oriented so that the barbed ends face inwardly. The fishhooks are thus fixedly supported so that they incline away from the bottom or narrow end of the body member having the fish line attaching means. Since the barbed ends of the fishhooks are on the inside of the fishhooks, the arms and the shanks of the fishhooks guide underwater obstructions away from the barbed ends of the fishhooks.

Another advantage of the invention is the fact that for either still fishing or trolling, the fishhooks are orientated so that they are readily accessible to the fish, that is, so that the barbed ends of the fishhooks have a substantial component in a horizontal direction, so that the fish do not have to stand on end to take the fishhooks in their mouths.

Still another advantage of the invention is that it enables the ready removal of the fishhooks from the body member, as by the simple expedient of disconnecting the eyelets at the base ends of the fishhooks from the hooks of the body member and then slipping the shanks of the fishhooks out of the loops of the resilient arms. One or more new fishhooks of the same or different size may then be attached to the body member by an inversion of this process of removal.

The above-mentioned body member may form a sinker which will drop the fishhook assembly to the bottom of the body of the water involved or to an intermediate elevation. Most preferably, however, the body member is hollow and is of a weight to drop the fishhook assembly just below the surface of the walls for surface fishing. It has a removable cover which enables the selective insertion or removal of buck-shot from the interior thereof to vary the sinking characteristics of the fishhook assembly.

These and other objects, advantages and features of the invention will become apparent upon making reference to the specification to follow, the claims and the drawings wherein:

Fig. 1 is a plan view of a fishhook assembly constructed in accordance with the invention as it is being pulled through the water;

Fig. 2 is an enlarged perspective view of the fishhook assembly of Fig. 1 showing its position while sinking or in a still position;

Fig. 3 is a plan view of the fishhook assembly of Fig. 2;

Fig. 4 is an enlarged fragmentary plan view of the assembly of Fig. 3;

Fig. 5 is a vertical sectional view of the portion of the fishhook assembly shown in Fig. 4, taken along section line 5—5 in Fig. 4;

Fig. 6 is a perspective view of a modified form of fishhook assembly constructed in accordance with the present invention; and Fig. 7 is an enlarged vertical sectional view through the fishhook assembly of Fig. 6, taken along section line 7—7 thereof.

Referring now more particularly to the embodiment of the invention shown in Figs. 1 through 5, the fishhook assembly there shown comprises a body member generally indicated by the reference numeral 2 which is of a shape which will orient the fishhook assembly in a definite position in the water when it is sinking or resting in the water. To this end, the body member preferably is of tapered cross-section, such as the hemispherical shape shown in the drawings. The body member may be cast out of metal, such as lead, or it may be molded of a synthetic plastic material. With the proper selection of the size and weight of the body member 2, the fishhook assembly can be made to sink to the bottom of the body of water involved or to assume an elevation just beneath the top of such body of water or at an intermediate elevation.

The narrow or rounded end of the body member is provided with a fish line attaching means 4 to which a fish line 5 is attached. As illustrated, the fish line attaching means is an eyelet formed by a doubled-back metal wire 6 embedded in the molded body member, the ends 7—7 of which project beyond the opposite or flat end of the body member. The ends 7—7 of the wire are in juxtaposed relation and are bent in opposite directions toward the body member to form fishhooks, as shown most clearly in Fig. 5. The hooked ends 7—7 form fishhook-end attaching means for receiving the conventional eyelets 8—8 at the base ends of respective fishhooks 10—10. The eyelets 8—8 each extend in a plane which is transverse to the plane containing the legs of the hooked end of the fishhook involved.

A first pair of long resilient arms 12—12 project from the opposite sides of the body member and are in planes which correspond generally with the planes of the hooks 7—7. The resilient arms incline outwardly and away from the narrow end of the body member containing the fish line attaching means 4. The arms 12—12 preferably make equal angles with the longitudinal axis of the body member, for example in the neighborhood of 75 degrees, and are formed of respective resilient wires embedded in the body member 2. The ends of the arms 12—12 are bent to form respective loops 14—14 each of which are most advantageously in the plane of the associated arm in its unstressed state. The loops 14—14 are sized to receive the eyelets 8—8 at the base ends of the fishhooks 10—10. The eyelet 8 of each of the fishhooks extends over the hooked fishhook-end attaching means 7 which faces away from the fishhook involved, and the shank 10' thereof passes through the loop 14 of the associated arm 12. To anchor the eyelet end of each fishhook around the associated hook 7 while the shank 10' thereof passes through the loop 14 of the associated arm requires the flexing of the arm as shown in Fig. 3. Each fishhook is positioned so that its barbed end 10 faces inwardly toward the barbed end 10" of the companion fishhook member. Also, the plane of the barbed end and the shank of each fishhook is in a radial plane which includes the fish line attaching means 4. The barbed leg 10" of each fishhook preferably makes an angle in the neighborhood of 45 degrees with the axis of the body member 2 so that it has a substantial horizontal component when the axis of the body member is oriented horizontally or vertically.

To mount a fishhook 10 in place, the user orients the fishhook with its barbed end facing radially inwardly and then passes the eyelet 8 thereof through the loop 14 of the associated support arm 12, and the eyelet 8 at the end thereof is looped over the hook 7 which faces away from the fishhook involved. As above indicated, the associated arm 12 must be flexed to bring the eyelet 8 of the fishhook over the hook 7. The resiliency of the arms 12—12 lock the fishhooks in place on the body member. To remove a fishhook, it is only necessary to flex the associated support arm 12 to enable the fishhook eyelet 8 to be pulled off the end of the associated hook 7. The fishhooks are thereby supported in a position where they will not readily get snagged in seaweed and the like since the arms 12 and the shanks 10' of the fishhooks guide obstructions away from the barbs thereon.

To further prevent obstructions from gaining access to the barbed ends of the fishhooks, a second pair of resilient arms 16—16 are provided which extend from opposite sides of the body member at points spaced about 90 degrees from the first pair of arms 12—12. The second pair of resilient arms 16—16 may be made of metal wires embedded in the molded material forming the body member 2. The arms 16—16, as the other arms 12—12, incline outwardly away from the narrow end of the body member and make similar equal angles with the longitudinal axis line thereof. The arms 16—16 thus guide obstructions away from the space between the hooks 10—10 to minimize the possibility of the fishhooks catching on seaweed and the like. In the embodiment of the invention now being described, the second pair of resilient arms 16—16 are not adapted to support fishhooks and, therefore, do not have looped ends as do the first pair of resilient arms 12—12.

Due to the tapered shape of the body member 2, when it rests in the water or when it sinks, it will orientate itself so that the axis of the body member 2 is vertical and the first and second pair of resilient support arms and the shanks of the hooks incline upwardly and outwardly. The barbed ends of the hooks then extend in directions having a substantially horizontal component where they are readily accessible to the fish. Also, the fishhooks are supported in a position where the resilient arms guide seaweed and the like away from the barbed ends of the hooks.

When the fishhook assembly is being pulled through the water, the axis of the body member 2 is horizontal and the fish line connecting eyelet 4 is facing forward. Due to the inclined angle between the fishhook shanks and the longitudinal axis line of the body member, the barbed ends of all of the hooks will be horizontal or will have a substantial component in a horizontal plane thus making the fishhooks readily accessible to the fish, irrespective of the rotational position of the fishhook assembly in the water. Also, the resilient guide arms 12—12 and 16—16 angle outwardly and rearwardly away from the fish line and guide obstructions away from the barbed ends of the fishhooks. The fishhook assembly resembles a spider or the like which is especially attractive to certain fish.

Refer now to Figs. 6 and 7 showing a modified form of the invention wherein three fishhooks 10—10—10 are supported from a modified body member 2'. The body member 2' is shown as a hollow molded plastic member having a hemispherically shaped shell portion 2a and a cover 2b press-fitted into the open end of the shell portion 2a. The shell 2a may contain buck-shot or other suitable weights 2a to control the depth to which the fishhook asembly will sink. When all of the buck shot is removed from the body member, it preferably is of a weight to support the fishhook assembly a small distance below the surface of the water so that the barbed ends of the hooks are just below the surface of the water for good surface fishing.

The shell portion 2a and the cover 2b having aligned openings 22—24 which receive the shank 26 of an eye-bolt 28 having an eyelet 30 at the end adjacent the shell portion 2a, and a threaded end 32. The eyelet 30 of the eye-bolt 28 serves as a connecting point for the end of the fish line 5. The eyelets 8—8—8 at the ends of the fishhooks 10—10—10 extend around the eye-bolt shank 26 outside of the cover 2b. The eyelets 8—8—8 are held in place over the eye-bolt shank by a nut 34 threaded around the end of the latter eye-bolt shank.

Extending from points spaced apart about 120 degrees at the wide end of the shell portion 2a are resilient arms 12'—12'—12' which respectively have looped ends 14'—14'—14' which are sized to receive the eyelets 8—8—8 of the fishhooks. The looped ends of the resilient arms 12'—12'—12' surround the shanks of the fishhooks as in the embodiment of Fig. 2. The resilient arms and the shanks of the fishhooks incline outwardly and away from the narrow end of the body member also as in the previous described embodiment. The barbed ends of the fishhooks face inwardly and the hooks are in respective radial planes so that the resilient arms and the fishhook shanks guide obstructions away from the barbed ends of the hooks.

The present invention has thus provided a fishhook assembly having at least three resilient guide arms extending in different directions and inclining outwardly and away from the direction of movement of the assembly through the wall so as to guide obstructions away from the region within the confines of the arms. At least two of the arms furthermore preferably act as supports for fishhooks whose shanks are fixed in similar inclined positions upon the resilient arms. The bottoms of the hooks are preferably releasably anchored in such a way that the hooks are held in a position where the barbed ends of the hooks face inwardly so that obstructions are guided away from the barbed ends of the fishhooks by the resilient arms and/or the shanks of the fishhooks. The hooks are readily removable from the body member and the resilient arms thereof. Other advantages of the fishhook assembly include the reliability, ruggedness and low cost thereof.

The present invention has many aspects, some of which include only some of the advantages and features above mentioned and others of which incorporate all of the same in a single fishhook assembly.

It should be understood that numerous modifications may be made of the preferred forms of the invention above described without deviating from the broader aspects of the invention.

I claim as my invention:

1. Fishhook holding apparatus comprising a body member, fish line attaching means on one end of said body member to which means the end of a fish line is to be connected, fishhook-end attaching means on the opposite end of said body member, at least three substantially equally spaced snag-inhibiting resilient arms, at least one of which has a loop thereon, said arms being fixedly connected to said body member and inclining outwardly and away from the end of the body member having said fish line attaching means, and a fishhook having a shank passing through said arm loop and extending along said associated arm, and the inner end of said fishhook being removably rigidly connected to said fishhook-end attaching means.

2. Fishhook hold apparatus comprising a body member, fish line attaching means on one end of said body member to which means the end of a fishline is to be connected, fishhook-end attaching means comprising a hook on the opposite end of said body member, and at least three substantially equally spaced snag-inhibiting resilient arms projecting substantially beyond said body member, said arms being fixedly connected to said body member and inclining outwardly and away from the end of the body member having said fish line attaching means, at least one of said arms having a loop thereon in the plane of the associated arm, a fishhook having a barbed shank, said one arm being flexed so that said loop thereof receives the shank of said fishhook, and the end of said fishhook having an eyelet engaging said hook which comprises said fishhook-end attaching means, the resiliency of said flexed resilient arm locking the end of said fishhook on the hook comprising said fishhook-end attaching means.

References Cited in the file of this patent

UNITED STATES PATENTS

| | | |
|---|---|---|
| 13,649 | Johnson | Oct. 9, 1855 |
| 832,929 | Stanley | Oct. 9, 1906 |
| 1,313,567 | Ulrich | Aug. 19, 1919 |
| 2,473,564 | Bergren | June 21, 1949 |
| 2,554,735 | Gibson | May 29, 1951 |
| 2,624,150 | Jolley | Jan. 6, 1953 |